United States Patent
Wachsman

(10) Patent No.: US 7,174,100 B1
(45) Date of Patent: *Feb. 6, 2007

(54) METHOD AND SYSTEM FOR PERFORMING OTDM

(75) Inventor: John M. Wachsman, Dublin, CA (US)

(73) Assignee: Finisar Corporation, Sunnyvale, CA (US)

( * ) Notice: Subject to any disclaimer, the term of this patent is extended or adjusted under 35 U.S.C. 154(b) by 733 days.

This patent is subject to a terminal disclaimer.

(21) Appl. No.: 09/824,360

(22) Filed: Apr. 2, 2001

(51) Int. Cl.
*H04J 14/00* (2006.01)

(52) U.S. Cl. .................... 398/47; 398/75; 398/147

(58) Field of Classification Search ............ 398/32, 398/34, 81, 202, 29, 147, 148, 159, 52, 47, 398/75
See application file for complete search history.

(56) References Cited

U.S. PATENT DOCUMENTS

| | | | |
|---|---|---|---|
| 5,894,362 A * | 4/1999 | Onaka et al. ............ | 398/95 |
| 5,909,297 A * | 6/1999 | Ishikawa et al. ......... | 398/198 |
| 6,330,089 B1 | 12/2001 | Yamada | |
| 6,337,660 B1 * | 1/2002 | Esman et al. ........... | 342/375 |
| 6,542,269 B1 | 4/2003 | Martinelli et al. | |
| 6,574,402 B2 | 6/2003 | Zakharenkov et al. | |
| 6,614,583 B1 * | 9/2003 | Wachsman ............. | 359/326 |
| 6,621,619 B2 | 9/2003 | Strutz et al. | |
| 2003/0016437 A1* | 1/2003 | Islam et al. ............ | 359/334 |

* cited by examiner

*Primary Examiner*—David C. Payne
(74) *Attorney, Agent, or Firm*—Workman Nydegger

(57) ABSTRACT

A method and system for performing OTDM. Laser wavelength tuning is used to create appropriate time differentials between bits in a combined optical output data stream.

23 Claims, 3 Drawing Sheets

METHOD AND SYSTEM FOR PERFORMING OTDM

FIELD OF THE INVENTION

The invention relates to optical time division multiplexing (OTDM), and in particular to an OTDM transmitter.

BACKGROUND

In a conventional OTDM transmitter, several optical signals modulated at bit rate B using the same carrier frequency are multiplexed optically to form a composite optical signal at a higher bit rate nB, where n is the number of multiplexed optical channels.

Specifically, multiplexing of these n constituent bit streams is achieved by launching them into an optical fiber with time delays. The bit stream in the j-th channel is delayed optically by an amount (j−1)/nB, where j=1, . . . , n. The outputs of all channels are combined to form a composite signal as a return-to-zero (RZ) signal. The composite bit stream has a bit slot T=1/nB. Furthermore, in the composite bit stream, n consecutive bits in each interval of duration 1/B belong to n different channels, as required by the TDM scheme.

The optical delays above are typically implemented by using fiber segments of controlled lengths. As an example, a 1 mm fiber length introduces a delay of about 5 ps. Moreover, the relative delay in each channel must be precisely controlled to ensure the proper alignment of bits belonging to different channels. For a precision typically required for a 40 Gb/s OTDM signal, the delay length should be controlled to within 20 μm.

However, as link rate increases beyond 40 Gbs, conventional OTDM systems and methods begin to experience problems such as timing inaccuracy and smeared time differentials between any two bits of the output composite signal launched into the optical fiber.

BRIEF DESCRIPTION OF THE FIGURES

The accompanying drawings which are incorporated in and form a part of this specification illustrate embodiments of the invention and, together with the description, serve to explain the principles of the invention.

DETAILED DESCRIPTION

Reference is now made in detail to embodiments of the invention. While the invention is described in conjunction with the embodiments, the invention is not intended to be limited by these embodiments. On the contrary, the invention is intended to cover alternatives, modifications and equivalents which may be included within the spirit and scope of the invention as defined by the appended claims. Furthermore, in the following detailed description of the invention, numerous specific details are set forth in order to provide a thorough understanding of the invention. However, as is obvious to one ordinarily skilled in the art, the invention may be practiced without these specific details. In other instances, well-known methods, procedures, components, and circuits have not been described in detail so that aspects of the invention will not be obscured.

Figure 1:
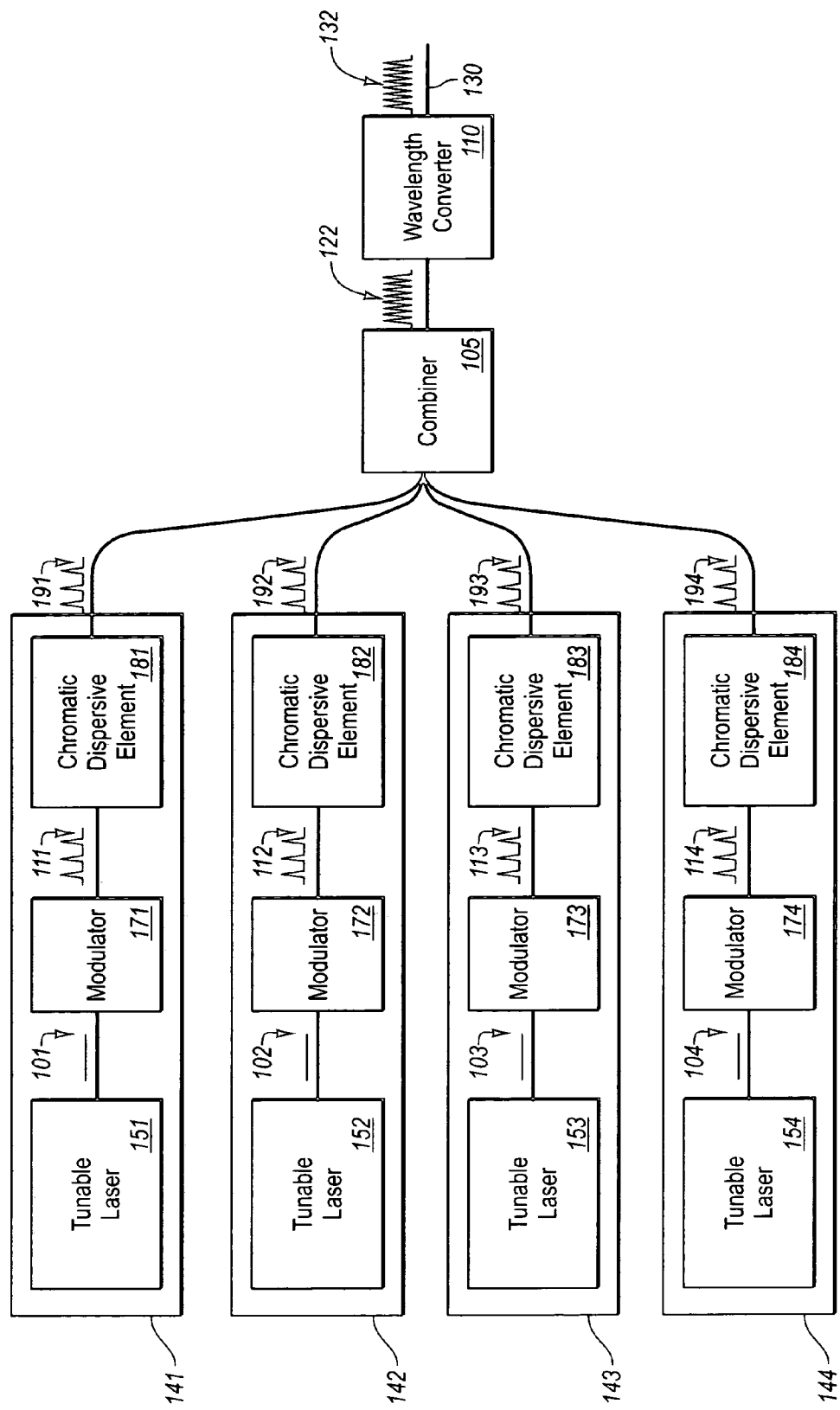
FIG. 1 shows an OTDM transmitter in accordance with one embodiment of the invention.

Referring now to FIG. 1, an OTDM transmitter 100 is shown in accordance with one embodiment of the invention. Transmitter 100 comprises four sources 151–154, four modulators 171–174, and four group velocity dispersive elements 181–184. These sources (151–154), modulators (171–174) and group velocity dispersive elements (181–184) are arranged as four input channels 141–144 of transmitter 100. Transmitter 100 also comprises a combiner 105 and a wavelength converter 110. Furthermore, transmitter 100 is coupled an optical link 130.

As shown within channel 141, source 151 is coupled to modulator 171 that is in turn coupled to group velocity dispersive element 181. Similarly, channels 142–144 are formed wherein sources 152–154 are coupled respectively to modulators 172–174 that are in turn coupled respectively to group velocity dispersive elements 182–184.

Referring still to FIG. 1, sources 151–154 are continuous wave (CW) tunable lasers. In channel 141, source 151 provides to modulator 131 a tunable CW laser beam 101 of wavelength $\lambda 1$. Modulator 131 modulates laser beam 101 and generates therefrom an output RZ bit stream 111. Bit stream 111 undergoes group velocity dispersion as it traverses the group velocity dispersive element 181 and emerges therefrom as a constituent RZ bit stream 191 of a composite bit stream 122.

Similarly, in channel 142, the constituent RZ bit stream 192 is generated from a CW tunable laser beam 102 of wavelength $\lambda 2$ that undergoes modulation (at modulator 172) and group velocity dispersion (at group velocity dispersive element 182). In channel 143, the constituent RZ bit stream 193 is generated from a CW tunable laser beam 103 of wavelength $\lambda 3$ that undergoes modulation at (modulator 173) and group velocity dispersion (at group velocity dispersive element 182). In channel 144, the constituent RZ bit stream 194 is generated from a CW tunable laser beam 104 of wavelength $\lambda 4$ that undergoes modulation (at modulator 174) and group velocity dispersion (at group velocity dispersive element 184).

The constituent bit streams 191–194 are adapted to be time-division-multiplexed into composite bit stream 122. As such, they are constituents of composite bit stream 122, which is also a RZ bit stream. These constituent bit streams (191–194) are first combined at combiner 105, resulting in composite bit stream 122 as the output of combiner 105. The composite bit stream 122 undergoes modification within wavelength converter 110 and emerges therefrom as a composite bit stream 132 having a wavelength $\lambda v$ adapted for transmission on optical link 130.

Also as understood herein, wavelengths $\lambda 1$, $\lambda 2$, $\lambda 3$ and $\lambda 4$ need not be the same. As such, in an alternative embodiment where $\lambda 1$, $\lambda 2$, $\lambda 3$ and $\lambda 4$ are not be the same, a wavelength multiplexer can be used instead of a combiner such as combiner 105.

For an OTDM transmitter in accordance with the present embodiment, each of the optical signals (constituent bit streams) is modulated at approximately bit rate B. These bit streams are optically time-division-multiplexed to form a composite optical signal at a higher bit rate nB, where n is the number of multiplexed optical channels. Specifically, time-division-multiplexing of these n constituent bit streams into composite bit stream 122 is achieved by launching them into an optical fiber with time delays. The modulated bit stream in the j-th channel is delayed optically by an amount (j−1)/nB, where j=1, . . . , n. The outputs of all channels are combined to form a composite signal as a pulsed signal such as a RZ signal. The multiplexed composite bit stream has a bit slot T=1/nB. Furthermore, in the composite bit stream, n consecutive bits in each interval of duration 1/B belong to n different channels, as required by the TDM scheme.

Specifically, continuing with FIG. 1, in the present embodiment, each of optical signals (bit streams 111–114) is modulated at approximately bit rate B (=10 Gb/s). Bit streams 111–114 are time-division-multiplexed optically to form composite bit stream 122 at a higher bit rate nB (=40 Gb/s), where n (=4) is the number of multiplexed optical channels 141–144. Specifically, time-division-multiplexing of these n (=4) constituent bit streams 191–194 into composite bit stream 122 is achieved by launching them consecutively into optical link 132 with time delays. The modulated bit stream in the j-th channel is delayed optically by an amount (j−1)/nB (=j−1)/(40 Gb/s)), where j=1, 2, 3 and 4. The outputs of all channels are combined to form time-division-multiplexed composite signal 122 as a pulsed signal such as a RZ signal. The multiplexed composite bit stream has a bit slot T=1/nB (=1/(40 Gb/s)). Furthermore, in the composite bit stream, 4 consecutive bits in each interval of duration 1/B (=1/(10 Gb/s)) belong respectively to 4 different channels 141–144, as required by the TDM scheme. As such, OTDM transmitter 100 outputs the composite RZ bit stream 132 as a 40 Gb/s RZ bit stream that is launched into optical link 130 for optical transmission.

In the present embodiment, through time delays produced by source wavelength tuning, a time separation of 1/(40 Gb/s) can be produced between each two consecutive bits on composite bit streams 122 and 132. As such, to properly align constituent bit streams 191–194 as they are combined to form composite bit stream 122, the optical delay amounts of 0/(40 Gb/s), 1/(40 Gb/s), 2/(40 Gb/s), and 3/(40 Gb/s) are introduced respectively into constituent bit streams 191–194. As described next, these time delays are implemented by tuning wavelengths $\lambda 1, \lambda 2, \lambda 3$ and $\lambda 4$ (of sources 151–154 respectively).

Referring still to FIG. 1, each of sources 151–154, being a CW tunable laser, produces a laser beam whose wavelength can be tuned. As such, $\lambda 1$ of source 151 and $\lambda 2$ of source 152 are tuned in order to produce the proper interleaving of bit stream 191 and bit stream 192 within the composite bit streams 122 and 132. Specifically, $\lambda 1$ and $\lambda 2$ are tuned to produce respectively bit streams 111–112 so that a time differential of T=1/(40 Gb/s) separates the bits within bit stream 191 from those within bit stream 192 as they emerge respectively from dispersive elements 181–182. Similarly, $\lambda 2$ and $\lambda 3$ are tuned to produce respectively bit streams 112–113 so that a time differential of T=1/(40 Gb/s) separates the bits within bit stream 192 from those within bit stream 193 as they emerge respectively from dispersive elements 182–183. Similarly, $\lambda 3$ and $\lambda 4$ are tuned to produce respectively bit streams 113–114 so that a time differential of T=1/(40 Gb/s) separates the bits within bit stream 193 from those within bit stream 194 as they emerge respectively from dispersive elements 183–184. Hence, by tuning $\lambda 1, \lambda 2, \lambda 3$ and $\lambda 4$, constituent bit streams 191–194 can be combined by combiner 105 into composite bit stream 122 that has the proper OTDM time spacing between every consecutive bit.

In the present embodiment, wavelength converter 110 is implemented with a vertical lasing semiconductor optical amplifier (VLSOA) whose vertical laser has wavelength $\lambda v$. Specifically, as wavelength converter 110, VLSOA's vertical lasing generates composite bit stream 132 with wavelength kv. As such, as composite bit stream 132 emerges from wavelength converter 130, its wavelength $\lambda v$ is independent of various wavelengths $\lambda 1, \lambda 2, \lambda 3$ and $\lambda 4$) contained within composite bit stream 122. Moreover, composite bit stream 132 is amplified because of the amplifying function of wavelength converter 110 implemented as a VLSOA.

However, as understood herein, wavelength converter 110 need not be implemented with a VLSOA. For example, in one embodiment of the invention, wavelength converter 110 is implemented using four-wave mixing. In another embodiment, wavelength converter 110 is implemented with a semiconductor optical amplifier (SOA). In yet another embodiment of the invention, wavelength converter 110 is implemented with a Mach-Zehner-SOA (MZ-SOA).

Also, as understood herein, channels 141–144 need not be 10 Gb/s per channel. For example, in another embodiment, each of bit streams (111–114) is modulated at approximately 40 Gb/s, thereby resulting in composite bit stream 132 that is approximately 160 Gb/s. Moreover, as understood herein, the present embodiment need not be implemented with n (=4) input channels such as channels 141–144. For example, in another embodiment, n (not=4) channels are time-division-multiplexed.

Furthermore, as understood herein, the constituent bit streams need not be generated from CW tunable lasers with modulators. For example, rather than the tunable laser sources being modulated by modulators to generate the constituent bit streams, tunable laser sources that are directly modulated lasers can be used to generate the constituent bit streams. Accordingly, in another embodiment of the invention, the constituent bit streams are generated from directly modulated laser sources.

Figure 2:
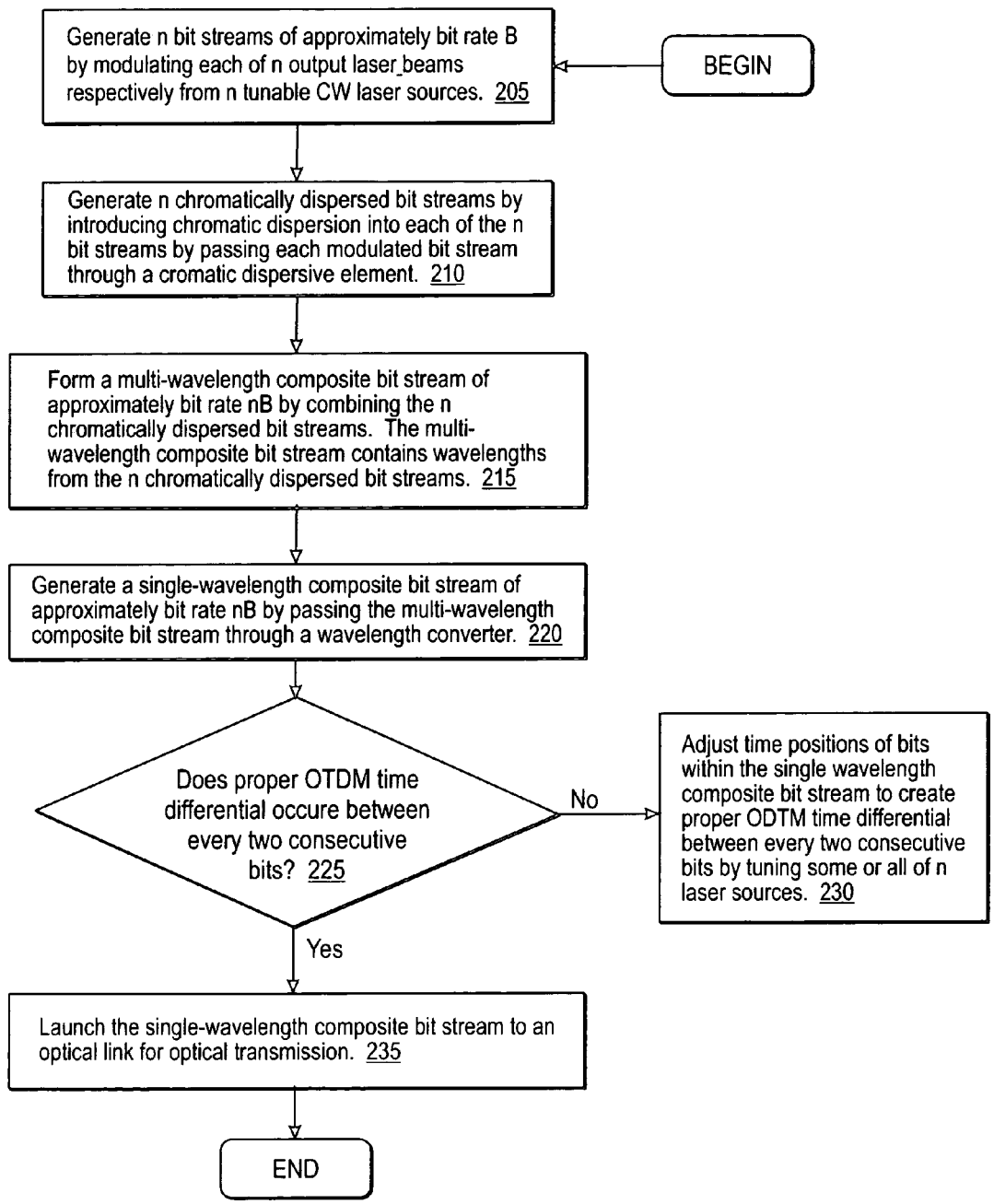
FIG. 2 shows a flow chart outlining steps for performing OTDM in accordance with one embodiment of the invention.

Referring now to FIG. 2, a flow chart 200 is shown outlining steps in performing OTDM transmission in accordance with one embodiment of the invention.

In step 205, n bit streams of approximately bit rate B are generated by modulating each of n output laser beams respectively from n tunable CW laser sources. However, as understood herein, these n bit streams need not be generated as such. For example, in another embodiment of the invention, these n bit streams can be generated from n tunable laser sources that are directly modulated.

In step 210, n group velocity dispersed bit streams are generated by introducing group velocity dispersion into each of the n bit streams by passing each modulated bit streams through a group velocity dispersive element.

In step 215, a multi-wavelength composite bit stream of approximately bit rate nB is formed by combining the n group velocity dispersed bit streams. The multi-wavelength composite bit stream contains wavelengths from the n group velocity dispersed bit streams. As understood herein, these n group velocity dispersed bit streams can be combined with a optical combiner or a wavelength multiplexer.

In step 220, a single-wavelength composite bit stream of approximately bit rate nB is generated by passing the multi-wavelength composite bit stream through a wavelength converter. The single-wavelength composite bit stream has a wavelength that is selected for optical transmission by a optical link. In the present embodiment, the wavelength converter is implemented with a VLSOA. However, as understood herein, in one embodiment of the invention, the wavelength converter is implemented with a SOA. In another embodiment of the invention, the wavelength converter is implemented with MZ-SOA. In yet another embodiment of the invention, the wavelength converter is implemented with four-wave-mixing.

In query step 225, either the multi-wavelength composite bit stream or the single-wavelength composite bit stream is examined to see if proper OTDM time differential occurs between every two consecutive bits. If yes, then step 235 is implemented. If no, then step 230 is performed.

In step 230, time positions of bits within the single-wavelength composite bit stream are adjusted to create proper OTDM time differential between every two consecutive bits by tuning some or all of n tunable laser sources. Query step 225 is then performed again.

In step 235, the single-wavelength composite bit stream is launched to an optical link for optical transmission.

Figure 3:
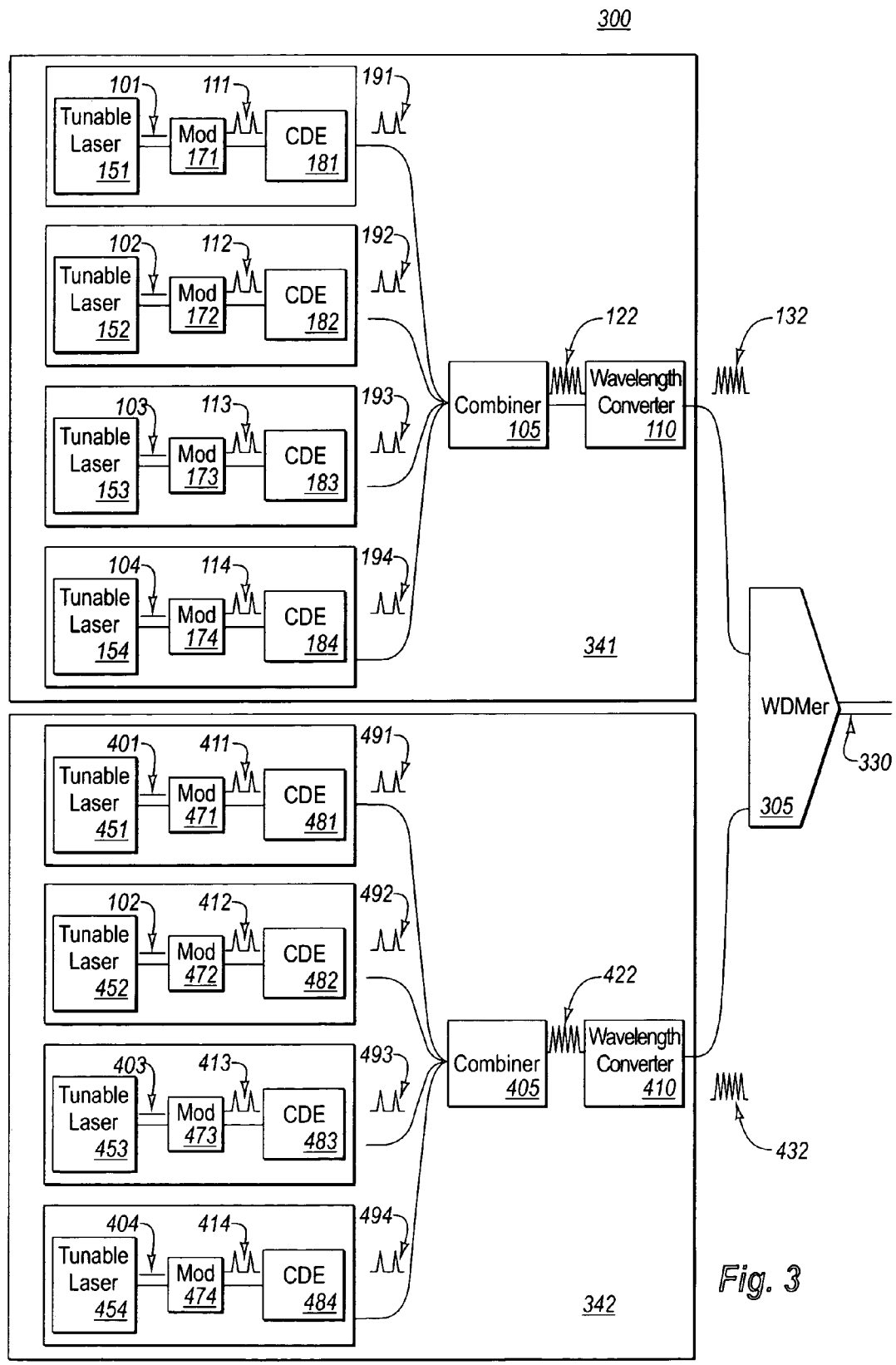
FIG. 3 shows a WDM system incorporating OTDM channels in accordance with one embodiment of the invention.

Referring now to FIG. 3, a wave-division-multiplexing (WDM) system 300 incorporating OTDM channels 341–342 is shown in accordance with one embodiment of the invention. WDM system 300 comprises input OTDM channels 341–342, a WDM multiplexer 305 and an optical link 330. Channel 341 contains a composite 4B Gb/s bit stream 132 ($\lambda v$) resulting from performing OTDM on four B Gb/s bit streams 191–194 (respectively $\lambda 1, \lambda 2, \lambda 3$ and $\lambda 4$) in accordance with one embodiment of the invention. Channel 342 contains a composite 4B Gb/s bit stream 432 ($\lambda v'$) resulting from performing OTDM on four B Gb/s bit streams 491–494 (respectively $\lambda 1', \lambda 2', \lambda 3'$ and $\lambda 4'$) in accordance with one embodiment of the invention.

As understood herein, wavelengths $\lambda 1, \lambda 2, \lambda 3$ and $\lambda 4$ need not be the same. Similarly, wavelengths $\lambda 1', \lambda 2', \lambda 3'$ and $\lambda 4'$ need not be the same. As such, in an alternative embodiment wherein $\lambda 1, \lambda 2, \lambda 3$ and $\lambda 4$ are not the same, and wherein $\lambda 1', \lambda 2', \lambda 3'$ and $\lambda 4'$ are not the same, wavelength multiplexers can be used instead of combiners.

Continuing with FIG. 3, channel 341 is coupled to WDM multiplexer 305; channel 342 is also coupled to WDM multiplexer 305. WDM multiplexer 305 is in turn coupled to optical link 330. Composite bit stream 132 of $\lambda v$ and composite bit stream 432 of $\lambda v'$ are wavelength-division-multiplexed to form a composite bit stream 332 having a bandwidth of 8B Gb/s, and carrying wavelengths of $\lambda v$ and $\lambda v'$.

Specifically, composite bit stream 132 as shown in FIG. 3 is generated by OTDM performed in accordance with the embodiment described in FIG. 1. Similarly, composite bit stream 432 as shown in FIG. 3 is generated by OTDM performed in accordance with the embodiment described in FIG. 1.

As understood herein, WDM system 300 need not be limited to two OTDM channels 341–342 as shown. For example, in one embodiment, a WDM system is implemented with m OTDM channels. As such, an optical signal having bandwidth of 4 mB Gb/s is transmitted by the WDM system to an optical link. Moreover, in another embodiment, a WDM system is implemented with m OTDM channels wherein each OTDM channel carries a composite bit stream formed by time-division-multiplexing n bit streams. As such, an optical signal having bandwidth of mnB Gb/s is transmitted by the WDM system to an optical link.

In the present embodiment, the wavelength converters 110 and 410 are implemented with VLSOAs. However, as understood herein, in one embodiment of the invention, the wavelength converters 110 and 410 are implemented with SOAs. In another embodiment of the invention, the wavelength converters 110 and 410 are implemented with MZ-SOAs. In yet another embodiment of the invention, the wavelength converters 110–410 are implemented using four-wave mixing.

Furthermore, as understood herein, the constituent bit streams need not be generated from CW tunable lasers with modulators. For example, rather than the tunable laser sources being modulated by modulators to generate the constituent bit streams, tunable laser sources that are directly modulated lasers can be used to generate the constituent bit streams. Accordingly, in another embodiment of the invention, the constituent bit streams are generated from directly modulated laser sources.

The foregoing descriptions of specific embodiments of the invention have been presented for purposes of illustration and description. They are not intended to be exhaustive or to limit the invention to the precise forms disclosed. Obviously, many modifications and variations are possible and consistent with the discussion above. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

What is claimed is:

1. A method for performing OTDM, said method comprising the following steps:
   a) generating n bit streams of approximately B Gb/s from respectively n tunable laser beams having respectively wavelengths of $\lambda 1, \lambda 2, \ldots$ and $\lambda n$;
   b) generating from said n bit streams n group velocity dispersed bit streams by introducing group velocity dispersion into said n bit streams;
   c) combining said n group velocity dispersed bit streams into a composite bit stream of approximately nB Gb/s; and
   d) in response to misalignment of bits within said composite bit stream, tuning said $\lambda 1, \lambda 2, \ldots$ and $\lambda n$ to create OTDM time differential between consecutive bits within said composite bit stream.

2. The method of claim 1, further comprising the following steps:
   e) generating a single-wavelength composite bit stream of approximately wavelength $\lambda v$ and nB Gb/s by operating on said composite bit stream with a wavelength converter; and
   f) in response to misalignment of bits within said single-wavelength composite bit stream, tuning said $\lambda 1, \lambda 2, \ldots$ and $\lambda n$ to create OTDM time differential between consecutive bits within said single-wavelength composite bit stream.

3. An OTDM transmitter, comprising:
   a) n channels of bit streams D1, D2, ... and Dn having respectively wavelengths of $\lambda 1, \lambda 2, \ldots$ and $\lambda n$, wherein for j=1 to n, the j-th channel comprises:
      j1) a tunable laser source Sj providing a bit stream Bj of approximately B Gb/s; and
      j2) a group velocity dispersive element Ej coupled to said Sj, introducing group velocity dispersion into said Bj to generate said Dj;
   b) a combiner coupled to said n channels and adapted to optically combine said D1, D2, and Dn into a composite bit stream of approximately nB Gb/s; and
   c) a wavelength converter coupled to said combiner and adapted to convert said composite bit stream into a single-wavelength composite bit stream of approximately nB Gb/s to be transmitted through an optical link, wherein OTDM time differential can be created between consecutive bits of said single-wavelength composite bit stream by tuning $\lambda 1, \lambda 2, \ldots$ and $\lambda n$.

4. A method for performing OTDM transmission, said method comprising the steps of:
   a) generating n bit streams of approximately B Gb/s from respectively n tunable laser beams having respectively initial wavelengths of $\lambda 1, \lambda 2, \ldots$ and $\lambda n$;
   b) generating n group velocity dispersed bit streams by introducing group velocity dispersion into said n bit streams;
   c) combining said n group velocity dispersed bit streams into a composite bit stream of approximately nB Gb/s;
   d) generating a single-wavelength composite bit stream of wavelength $\lambda v$ by wavelength converting said composite bit stream with a wavelength converter;
   e) in response to misalignment of bits within said single-wavelength composite bit stream, tuning said $\lambda 1, \lambda 2, \ldots$ and $\lambda n$ to create OTDM time differential between consecutive bits within said single-wavelength composite bit stream; and
   f) transmitting said single-wavelength composite bit stream by launching said single-wavelength composite bit stream into an optical transmission link.

5. A WDM system, comprising:
   a) m OTDM channels, wherein for k=1 to m, the k-th OTDM channel comprises:
      k1) n channels Vk1, Vk2, ... and Vkn providing respectively bit streams Dk1, Dk2, ... and Dkn having respectively wavelengths of $\lambda k1, \lambda k2, \ldots$ and $\lambda.kn$, wherein for j=1 to n, the j-th channel Vkj comprises:
         kj1) a tunable laser source Skj providing a bit stream Bkj of approximately B Gb/s; and
         kj2) a group velocity dispersive element Ekj coupled to said Skj, introducing group velocity dispersion into said Bkj to generate said Dkj;
      k2) a combiner coupled to said n channels and adapted to optically combine said n bit streams into a composite bit stream Uk;
      k3) a wavelength converter coupled to said combiner and adapted to convert said composite bit stream into a single-wavelength composite bit stream Ak of wavelength $\lambda vk$, wherein OTDM time differential can be created between consecutive bits of said Ak by tuning $\lambda k1, \lambda k2, \ldots$ and $\lambda kn$; and
   b) a WDM multiplexer coupled to said m OTDM channels, with said WDM multiplexer adapted to generate a composite optical signal with a data rate of approximately mnB Gb/s.

6. An OTDM subsystem for performing optical time-division-multiplexing, said OTDM subsystem comprising:
   a) n channels of bit streams D1, D2, ... and Dn having respectively wavelengths of $\lambda 1, \lambda 2, \ldots$ and $\lambda n$, wherein for j=1 to n, the j-th channel comprises:
      j1) a tunable laser source Sj providing a bit stream Bj of approximately B Gb/s; and
      j2) a group velocity dispersive element Ej coupled to said Sj, introducing group velocity dispersion into said Bj to generate said Dj;
   b) a combiner coupled to said N channels and adapted to optically combine said D1, D2, and Dn into a composite bit stream of approximately nB Gb/s, wherein OTDM time differential can be created between consecutive bits of said composite bit stream by tuning $\lambda 1, \lambda 2, \ldots$ and $\lambda n$.

7. The method according to claims 2 or 4, wherein return-to-zero (RZ) format is used in generating bit streams.

8. The method according to claims 1, 2 or 4, wherein said B Gb/s is 10 Gb/s, and wherein said n is 4.

9. The method according to claims 1, 2 or 4, wherein said B Gb/s is 40 Gb/s, and wherein said n is 4.

10. The device according to claims 3 or 5, wherein said wavelength converter is a vertical lasing semiconductor optical amplifier (VLSOA), and wherein said single wavelength is generated from the vertical lasing of said VLSOA.

11. The device according to claims 3 or 5, wherein said wavelength converter uses four-wave mixing.

12. The device according to claims 3 or 5, wherein said wavelength converter is a MZ-SOA.

13. The device according to claims 3 or 5, wherein said wavelength converter is a SOA.

14. The method of claim 1, wherein said n bit streams are generated by modulating respectively n CW tunable laser sources.

15. The method of claim 1, wherein said n bit streams are generated respectively by n directly modulated tunable laser sources.

16. The OTDM transmitter of claim 3, wherein for said j=1 to n, said Sj in said j-th channel is a CW tunable laser that is coupled to a modulator Mj, said Mj modulating a laser beam Lj generated by said Sj into said Bj.

17. The OTDM transmitter of claim 3, wherein for said j=1 to n, said Sj in said j-th channel is a tunable laser that is directly modulated.

18. The method of claim 4, wherein said n bit streams are generated by modulating respectively n CW tunable laser sources.

19. The method of claim 4, wherein said n bit streams are generated respectively by n directly modulated tunable laser sources.

20. The WDM system of claim 5, wherein for k=1 to m and j=1 to n, said tunable laser source Skj in said j-th channel Vkj is a tunable CW laser source that is coupled to a modulator Mkj, said Mkj modulating a laser beam Lkj produced from said Skj into said stream Bkj.

21. The WDM system of claim 5, wherein for k=1 to m and j=1 to n, said tunable laser source Skj in said j-th channel Vkj is a tunable laser that is directly modulated.

22. The OTDM subsystem of claim 6, wherein for said j=1 to n, said Sj in said j-th channel is a CW tunable laser that is coupled to a modulator Mj, said Mj modulating a laser beam Lj generated by said Sj into said Bj.

23. The OTDM subsystem of claim 6, wherein for said j=1 to n, said Sj in said j-th channel is a tunable laser that is directly modulated.

* * * * *

UNITED STATES PATENT AND TRADEMARK OFFICE
CERTIFICATE OF CORRECTION

PATENT NO.      : 7,174,100 B1                                    Page 1 of 3
APPLICATION NO. : 09/824360
DATED           : February 6, 2007
INVENTOR(S)     : Wachsman et al.

It is certified that error appears in the above-identified patent and that said Letters Patent is hereby corrected as shown below:

Drawings
Sheet 2, replace Fig. 2 with the figure depicted herein below, wherein label --200-- has been added and wherein "occure" on labeled step "225" has been changed to --occur--

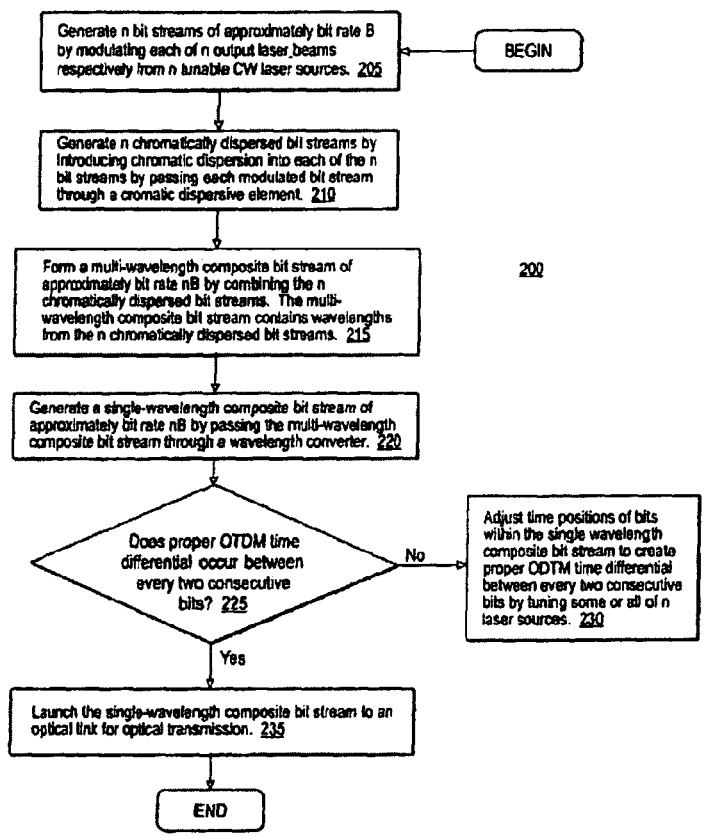

Fig. 2

Signed and Sealed this

Twenty-third Day of November, 2010

David J. Kappos
*Director of the United States Patent and Trademark Office*

Sheet 3, replace Fig. 3 with the figure depicted herein below, wherein a "composite bit stream" has been added and labeled --332-- and wherein the laser beam from "tunable laser 452" has been changed from "102" to --402--

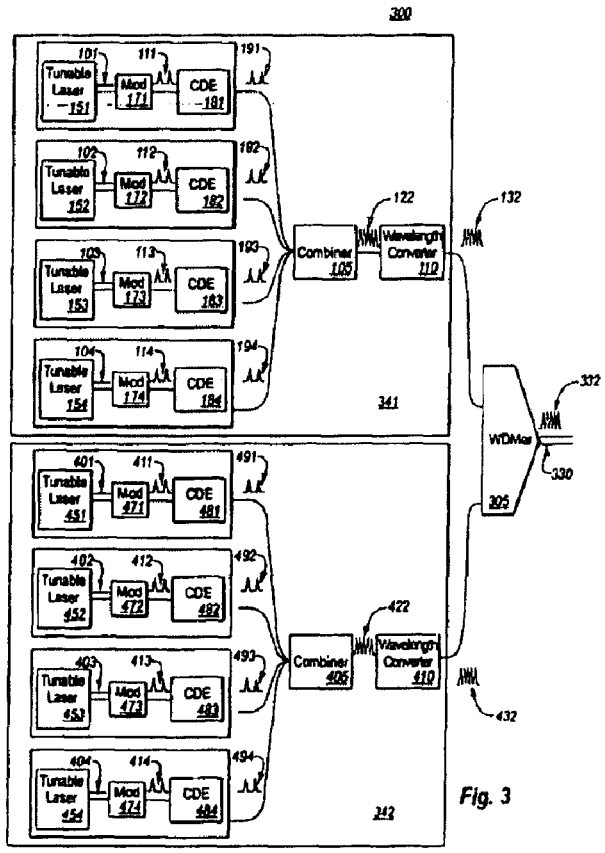

Fig. 3

Column 2
Line 14, change "coupled an" to --coupled to an--
Line 23, change "131" to --171--
Line 24, change "131" to --171--
Line 38, change "182" to --183--

Column 3
Line 16, change "132" to --130--

Column 4
Line 1, change "130" to --110--
Line 2, change "λ1" to --(λ1--
Line 54, before "optical" change "a" to --an--
Line 60, before "optical" change "a" to --an--

Column 7
Line 28, change "$\lambda.kn$" to --$\lambda kn$--

Column 8
Line 34, change "saidj-th" to --said j-th--